US008413214B2

(12) United States Patent
Kato et al.

(10) Patent No.: US 8,413,214 B2
(45) Date of Patent: Apr. 2, 2013

(54) TERMINAL SYSTEM FOR GUARANTEEING AUTHENTICITY, TERMINAL, AND TERMINAL MANAGEMENT SERVER

(75) Inventors: Takatoshi Kato, Yokohama (JP);
Katsuyuki Umezawa, Machida (JP);
Makoto Kayashima, Yokohama (JP);
Masaya Umemura, Yokosuka (JP);
Akira Kanehira, Tokyo (JP)

(73) Assignee: Hitachi, Ltd, Tokyo (JP)

( * ) Notice: Subject to any disclaimer, the term of this patent is extended or adjusted under 35 U.S.C. 154(b) by 186 days.

(21) Appl. No.: 12/709,241

(22) Filed: Feb. 19, 2010

(65) Prior Publication Data
US 2010/0269153 A1 Oct. 21, 2010

(30) Foreign Application Priority Data
Mar. 19, 2009 (JP) ................................. 2009-068595

(51) Int. Cl.
*G06F 7/04* (2006.01)
(52) U.S. Cl. ................. 726/3; 726/17; 726/22; 713/168; 713/187
(58) Field of Classification Search .................... None
See application file for complete search history.

(56) References Cited

U.S. PATENT DOCUMENTS

| 7,149,895 | B1 | 12/2006 | Asokan et al. | |
|---|---|---|---|---|
| 7,260,720 | B2* | 8/2007 | Yamamoto et al. | 713/169 |
| 7,386,722 | B2* | 6/2008 | Umezawa et al. | 713/156 |
| 7,739,514 | B2* | 6/2010 | Bangui | 713/187 |
| 7,934,006 | B2* | 4/2011 | Kato et al. | 709/229 |
| 7,950,045 | B2* | 5/2011 | Bogineni et al. | 726/3 |
| 7,962,742 | B2* | 6/2011 | Schwarz | 713/151 |
| 8,015,417 | B2* | 9/2011 | Kato et al. | 713/193 |
| 8,019,996 | B2* | 9/2011 | Hashimoto et al. | 713/169 |
| 8,024,559 | B2* | 9/2011 | Jung et al. | 713/155 |
| 8,056,120 | B2* | 11/2011 | Kusakari | 726/2 |

(Continued)

FOREIGN PATENT DOCUMENTS

| EP | 1 026 641 A1 | 8/2000 |
|---|---|---|
| JP | 2002-312316 | 10/2002 |
| JP | 2005-094619 A | 4/2005 |
| JP | 2009-043042 A | 2/2009 |

OTHER PUBLICATIONS

"The implementation cost may be recovered for five or six years", Jun. 2008, pp. 14-15, CardWave, vol. 21, No. 7.
Office Action received in Japanese Patent Application No. 2009-068595 dated Nov. 27, 2012.

*Primary Examiner* — Hadi Armouche
*Assistant Examiner* — Jaron K Brunner
(74) *Attorney, Agent, or Firm* — Foley & Lardner LLP

(57) ABSTRACT

In a terminal system for managing terminals coupled to a network, a terminal management server includes: a terminal information registration module for registering, in advance, information unique to each user of the terminal; an authentication module for executing authentication by comparing an ID and authentication information which are contained in an authentication request received from the terminal to user information set in advance; an authenticity determination module for determining, based on a predetermined investigation result received from the terminal, whether or not the terminal suffers falsification; and a unique information transmission module for transmitting, when the authentication is successful, and when the authenticity determination module has determined that the terminal does not suffer the falsification, the information unique to the each user to the terminal. The terminal outputs the information unique to the each user received from the terminal management server to a display unit.

7 Claims, 8 Drawing Sheets

U.S. PATENT DOCUMENTS

2001/0025346 A1* 9/2001 Kayashima et al. .......... 713/200
2008/0005037 A1* 1/2008 Hammad et al. ................ 705/67
2008/0016335 A1* 1/2008 Takahashi et al. ............ 713/156
2008/0133937 A1* 6/2008 Kato et al. .................... 713/193

* cited by examiner

FIG.4

| TERMINAL ID 401 | USER ID 402 | DEVICE TYPE 403 | ADDRESS 404 | MANAGEMENT ID 405 | HISTORY 406 | STATUS 407 | LOCATION 408 | AUTHENTICITY VERIFICATION INFORMATION 409 | REMARK 410 |
|---|---|---|---|---|---|---|---|---|---|
| 00000001 | 00000001 | A | xxx.xxx.xxx.xxx | 00000001 | {2009/10/10 23:45 Statu=001, ...} | 00000010 | x | x | x |
| 00000002 | ... | ... | ... | ... | ... | ... | ... | ... | ... |

| USER ID | CERTIFICATE | SECRET INFORMATION | MANAGEMENT ID | HISTORY | STATUS | TERMINAL ID | REMARK |
|---|---|---|---|---|---|---|---|
| 501 | 502 | 503 | 504 | 505 | 506 | 507 | 508 |
| 00000001 | x | 637463827 | 00000001 | {2009/10/10 23:45 Statu=001,...} | 00000010 | 00000001 | x |
| 00000002 | ... | ... | ... | ... | ... | ... | ... |

105

TERMINAL SYSTEM FOR GUARANTEEING AUTHENTICITY, TERMINAL, AND TERMINAL MANAGEMENT SERVER

CLAIM OF PRIORITY

The present application claims priority from Japanese patent application JP2009-68595 filed on Mar. 19, 2009, the content of which is hereby incorporated by reference into this application.

BACKGROUND

This invention relates to a terminal system for notifying a user of authenticity of a terminal which receives a provided service, to thereby enable the user to safely receive the provided service.

In order to increase productivity of workers, a work style referred to as teleworking in which a worker works around a location which is different from a workplace determined in advance has become widespread. In particular, more and more users such as sales persons conduct tasks referred to as mobile tasks, which mainly involve sending/receiving electronic mails and preparing documents at home, on the street, and in a car.

As this work style has become popular, the number of information leakage accidents has increased in business enterprises, and therefore a thorough information management is required. As examples of the information leakage accidents, many accidents in which a PC or an information device taken out from a company is lost or stolen, or an individually-owned PC storing personal information is stolen by a theft at home are reported. A common reason for these accidents is because media storing information are taken out from a company.

As a solution to the information leakage as described above, needs for the thin client system are increasing in enterprises. In this system, information devices such as note PCs without a storage are used to be remotely coupled to an in-house system via networks such as a mobile phone network and a public LAN, and the information itself is not taken out from the company. In this thin client system, an authentication feature is important for the coupling from the outside to the inside of the company. Conventionally, a smart card reader is coupled to a note PC or the like, and a personal smart card (such as employee ID card) or a security device is used for personal authentication, thereby permitting a coupling to the inside of the company.

On a public terminal such as a kiosk terminal installed on the street, a management status of the terminal is unknown, and it is thus hard for a user to receive a service in which information containing personal information and confidential information is handled in a safe status low in risk of information leakage and eavesdropping. Conventional technologies prevent such an illegal access that a terminal for which a user authentication is established is misused and another person spoofs the authorized user. A determination unit which determines whether or not the user authentication is established for a terminal blocks an access from the outside, thereby preventing an illegal access in which the terminal is misused and an authorized user is spoofed (see Japanese Patent Application Laid-open No. 2002-312316, for example).

SUMMARY

In the mobile task, a user usually carries a personalized terminal device such as a PC, a PDA, and a mobile phone, and uses the device at home or on the street. According to the conventional technologies, when a user does not carry the terminal device, the user uses a terminal device provided at a place where the user has moved after the user completes a user authentication on the terminal device, resulting in safe teleworking on the terminal device. On this occasion, even if the terminal to be used is changed, a terminal environment of the user needs to be maintained (portable). However, there is a problem that a terminal system which guarantees safety of an unspecified number of terminals for a user, or a terminal system which personalizes a terminal environment in order to ensure information security when a terminal to be used is switched over has not been realized yet.

For example, Japanese Patent Application Laid-open No. 2002-312316 discloses a technology which prevents such an illegal access that a terminal for which a user authentication is established is misused and another person spoofs the authorized user. In Japanese Patent Application Laid-open No. 2002-312316, the determination unit which determines whether or not the user authentication is established for a terminal blocks an access from the outside, thereby preventing an illegal access in which a terminal is misused and an authorized user is spoofed. However, in Japanese Patent Application Laid-open No. 2002-312316, an illegal access to a terminal in use by a user may be prevented, but on a terminal (such as a public terminal or a kiosk terminal) which is a device (computer) temporarily rented and used by a user, a third person may be running an illegal program when the user starts using the terminal. Thus, there is a problem with the conventional technology that the user cannot check the safety of a terminal.

The disclosed system provides a technology of presenting, by a terminal system, when a user uses a terminal with uncertain safety, the safety of the terminal to the user.

In an example, the terminal management server for managing a terminal presents safety of the terminal to the user, and, after the user confirms information presented by the terminal management server on the terminal, the user starts using a service.

Specifically, a terminal system includes: a terminal including a processor and a memory; and a terminal management server coupled to the terminal via a network, in which: the terminal further includes: an interface for communicating with an ID device for storing an ID and authentication information which are set in advance; an authentication request module for acquiring, via the interface, the ID and the authentication information from the ID device, and transmitting the ID and the authentication information as an authentication request to the terminal management server; an authenticity investigation module for investigating a status of the memory of the terminal; and an authenticity investigation result transmission module for transmitting a result of the investigation carried out by the authenticity investigation module to the terminal management server; the terminal management server includes: a terminal information registration module for registering, in advance, information unique to each user of the terminal; an authentication module for carrying out authentication by comparing the ID and the authentication information which are contained in the authentication request received from the terminal to user information set in advance; an authenticity determination module for determining, based on the result of the investigation received from the terminal, whether or not the terminal suffers falsification; and a unique information transmission module for transmitting, when the authentication is successful, and when the authenticity determination module has determined that the terminal does not suffer the falsification, the information unique to the each user to the terminal; and the terminal further includes a display unit for displaying the information unique to the each user received from the terminal management server so that the user confirms the information unique to the each user, to thereby guarantee authenticity of the terminal.

Therefore, according to teaching herein, when the user uses a terminal with uncertain safety, the terminal system presents the user the safety of the terminal, and thus, the user can safely receive a service provided from a server on the network. As a result, convenience and safety when the user uses the system are enhanced.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 4 illustrates an example of the terminal information stored in the storage of the terminal management server according to the first embodiment.

FIG. 5 illustrates an example of the user information stored in the storage of the terminal management server according to the first embodiment.

DETAILED DESCRIPTION OF THE EMBODIMENTS

Figure 1:
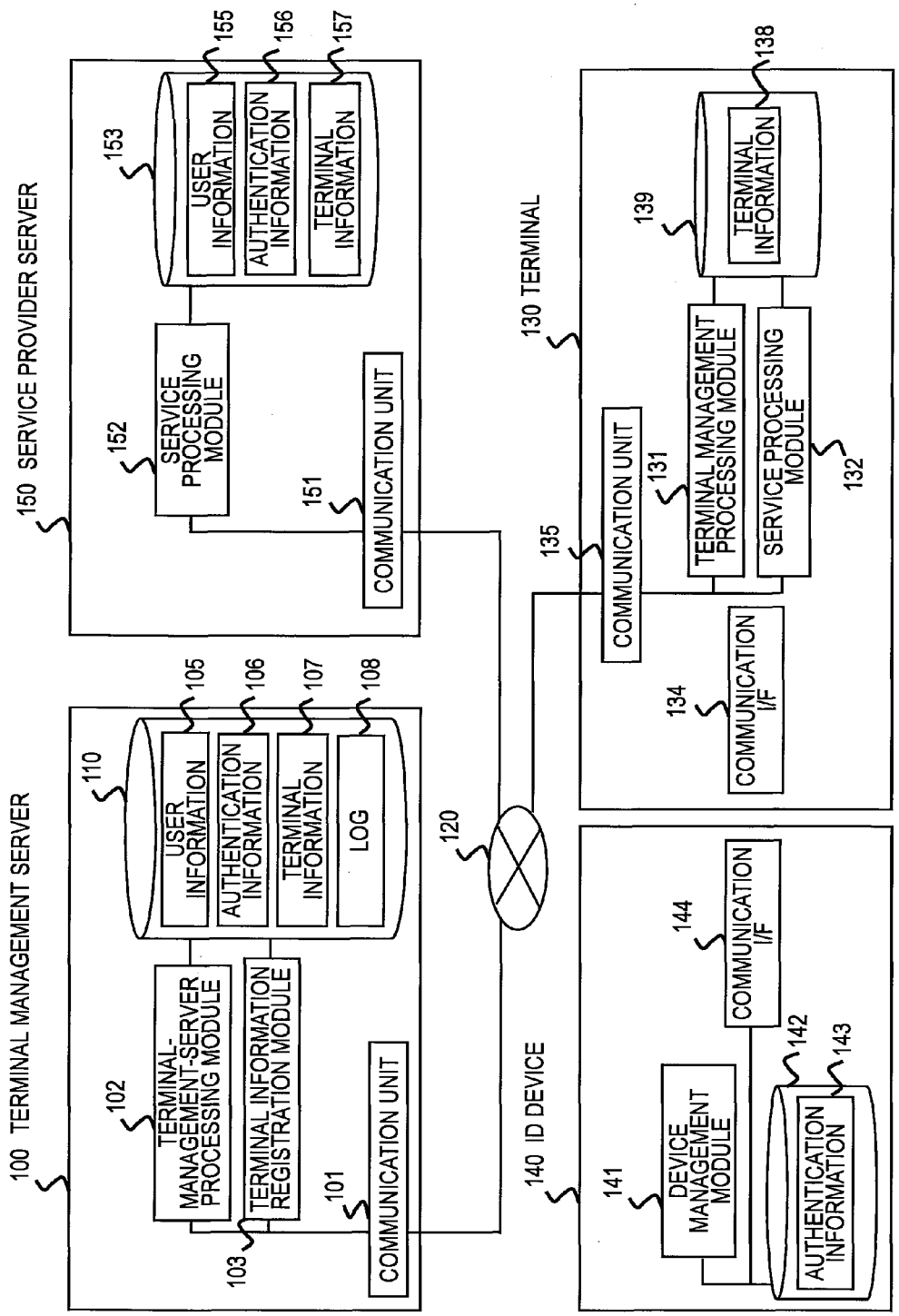
FIG. 1 is a block diagram illustrating an example of a functional configuration of a terminal system according to a first embodiment.

A description is now given of embodiments referring to drawings. Throughout the drawings, components denoted by like reference numerals provide like features.

First Embodiment

FIG. 1 is a block diagram illustrating an example of a functional configuration of a terminal system according to a first embodiment. To a network 120, a terminal management server 100, a service provider server 150, and a terminal 130 are coupled, and can communicate with each other. The communication between the network 120 and each of the devices is carried out by communication units (101, 151, and 135) of the terminal management server 100, the service provider server 150, and the terminal 130.

The terminal management server 100 includes a terminal-management-server processing module 102, a storage 110, and a terminal information registration module 103. The terminal-management-server processing module 102 transmits/receives data to/from the storage 110, and manages a plurality of terminals on the network 120 such as the terminal 130 via the communication unit 101. The storage 110 has a function to hold user information 105, authentication information 106, terminal information 107, and a log 108 of the terminal 130.

On this occasion, the user information 105 is used to manage information on a user who uses the terminal 130 of the terminal system and information on a privilege, a status, and a user environment of the user on the terminal 130 in association with each other, which are described later. The authentication information 106 is authentication information held by the terminal management server 100. Specifically, the authentication information 106 includes a common key, which is secret information held by the terminal management server 100 and a secret key corresponding to a public key certificate of the terminal management server 100. The authentication information 106 may be stored in an anti-tampering storage of the storage 110. The terminal information 107 is used to manage information of the terminal managed by the terminal management server 100 and information such as a privilege and a status of the terminal in association with each other, which are described later. It should be noted that the anti-tampering storage is a storage system which can restrain data from being analyzed or being tampered from the outside, and, for example, is provided with an encryption processing circuit in order to prohibit a data access in a status in which an authentication has not been completed, and a publicly known or widely known technology can be applied thereto. Moreover, the terminal-management-server processing module 102 and the terminal information registration module 103 are formed as software, are loaded from the storage 110 serving as a storage medium to a memory, and are executed by a processor described later.

The terminal 130 includes a terminal management processing module 131, a service processing module 132, a storage 139, a communication interface 134, and the communication unit 135. The terminal management processing module 131 transmits/receives data to/from the storage 139, communicates with the terminal management server 100 and the service provider server 150 on the network 120 via the communication unit 135, and, after authentication described later, provides a user of the terminal 130 with services provided from the service provider server 150. The storage 139 holds terminal information 138 thereinside. The terminal information 138 includes a terminal ID, a common key, a public key certificate of the terminal 130, and a secret key corresponding to a public key, which are secret information held by the terminal 130. The communication interface 134 and the communication unit 135 intermediate communications between functions in the terminal 130 and an ID device 140.

The service processing module 132 includes at least one application which displays a user environment when the terminal management processing module 131 makes a user environment described below available on the terminal 130, and is used by a user to receive services. Specifically, the service processing module 132 includes a browser application and an application for communicating with the service processing module 152 of the service provider server 150 to provide other services. It should be noted that the terminal management processing module 131 and the service processing module 132 are formed as software, are loaded from the storage 139 serving as a storage medium to a memory, and is executed by a processor described later.

The ID device 140 internally includes a device management module 141, a storage 142, and a communication interface 144. The device management module 141 transmits/receives data to/from the storage 142, and communicates with the terminal 130 via a communication interface 144. The storage 142 stores authentication information 143. The authentication information 143 includes a common key which is secret information held by a user, a public key certificate of the user, a secret key corresponding to a public key, and a server certificate used to verify authentication information transmitted by the terminal management server 100.

The user is provided with the ID device 140, and when the user uses the terminal 130 according to this embodiment, the user couples, to the terminal 130 having uncertain safety, the ID device 140 by causing the communication interfaces 144 and 134 to communicate with each other. The communication carried out between the communication interface 144 and the communication interface 134 of the terminal 130 includes the near field communication, the contact smart card communication, the contactless smart card communication, the serial communication for coupling to peripherals, and the parallel communication for coupling to peripherals. It should be noted that the ID device 140 may be, for example, formed as a smart card, or may constitute a part of a portable device.

The terminal 130 transmits a status of the coupling to the ID device 140 to the terminal management server 100, and transmits a request for authentication information to the ID device 140. Information transmitted to the ID device 140 is processed by the device management module 141, and, when the terminal management server 100 has determined that the terminal 130 can be used by the user, ID information, which is described later, is transmitted from the ID device 140 to the terminal 130, and the user now can use a user environment, which is registered by the user, on the terminal 130. This user environment is managed in the terminal information 107 of the terminal management server 100, and is registered by the user in advance.

Regarding the terminal information 107, the user environment is registered by the user according to policies of an administrator of the terminal management server 100 from a terminal (not shown) via the network 120 through using a function of the terminal information registration module 103. When the user registers the user environment, the user is granted user authentication by the terminal information registration module 103. The user environment registered in advance by the user to the terminal management server 100 includes a type and specifications of the terminal 130 used by the user, a communication environment, and information specific to the user (such as images, sounds, videos, and programs to be executed), and is registered in advance before the use of the terminal 130. The type of the terminal depends on a classification whether the terminal is a mobile phone, a PC, or a kiosk terminal, and a classification whether an application such as a browser is available. The specifications of the terminal 130 include a size and display capability of a screen, a processing performance, types of coupled peripherals, a memory capacity, input/output device types, a communication performance, a sound output capability, and security features. The communication environment is a status of a communication quality between a terminal and a server.

The service provider server 150 is a server computer which, when the user's terminal 130 makes an access, via the network 120, to the service provider server 150, provides the terminal 130 with a service, and includes a service processing module 152, a storage 153, and the communication unit 151. The service processing module 152 uses user information 155 in the storage 153, thereby authenticating a user. Moreover, the service processing module 152 uses terminal information 157 in the storage 153, thereby authenticating a terminal used by the user according to necessity. The user acquires, via the service processing module 152, authentication information of the service provider server 150 from the authentication information 106 in the storage 153 thereby authenticating the service provider server 150. When the user authentication and the terminal authentication are successful, the user receives the service from the service provider server 150 via the terminal 130. It should be noted that the service processing module 152 is formed as software, are loaded from the storage 153 serving as a storage medium to a memory, and is executed by a processor described later.

Figure 8:
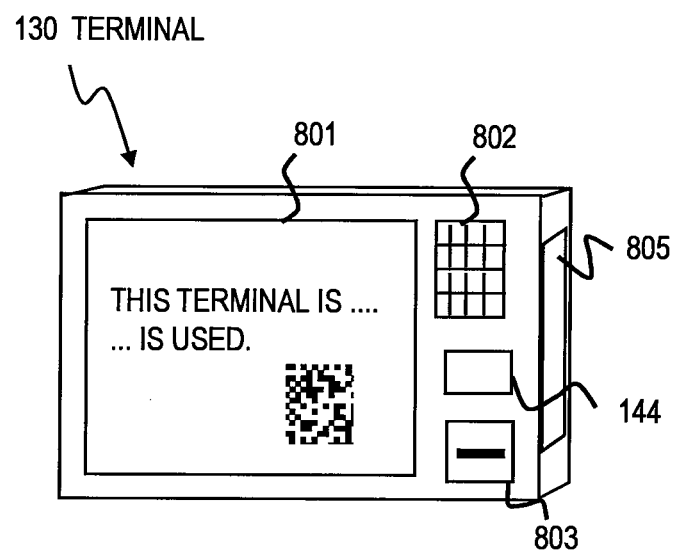
FIG. 8 illustrates an example of an exterior of the terminal according to the first embodiment.

FIG. 8 illustrates an example of an exterior of the terminal 130. The terminal 130 includes a screen 801, an input device 802 such as a touch panel, a keyboard, a numerical key pad, a reader/writer 803 for a magnetic card or a contact smart card, a communication interface 144 for a contactless smart card, and a seal for preventing opening 805 for explicitly presenting an effect of tamper proofing.

The screen 801 notifies the user, before the user uses the terminal 130 or while the user is using the terminal 130, of information of authenticity of the terminal 130 such as application of the terminal 130, a type of encryption used on the terminal 130, and a strength of the encryption. Moreover, on the screen 801, authentication information of the user and information on a result of verification such as a time when the authenticity of the terminal 130 was investigated and a time when the authenticity was verified by using the user environment registered to the terminal management server 100 can be displayed.

On the terminal 130, access information (URL represented as a two-dimensional barcode in FIG. 8) used for verifying, by means of an information device such as a mobile phone, the terminal ID, an installed location of the terminal 130, and a status relating to the authenticity (an internal status and a time when an administrator checked the authenticity last time) of the terminal 130 is displayed. Based on the access information, the user makes an inquiry to the terminal management server 100 about the authenticity of the terminal 130. The terminal management server 100 returns a reply, in response to the inquiry from the user, to the user based on the authenticity information transmitted by the terminal 130. The user can verify and confirm the reply based on information such as the public key certificate of the terminal management server 100.

Figure 9:
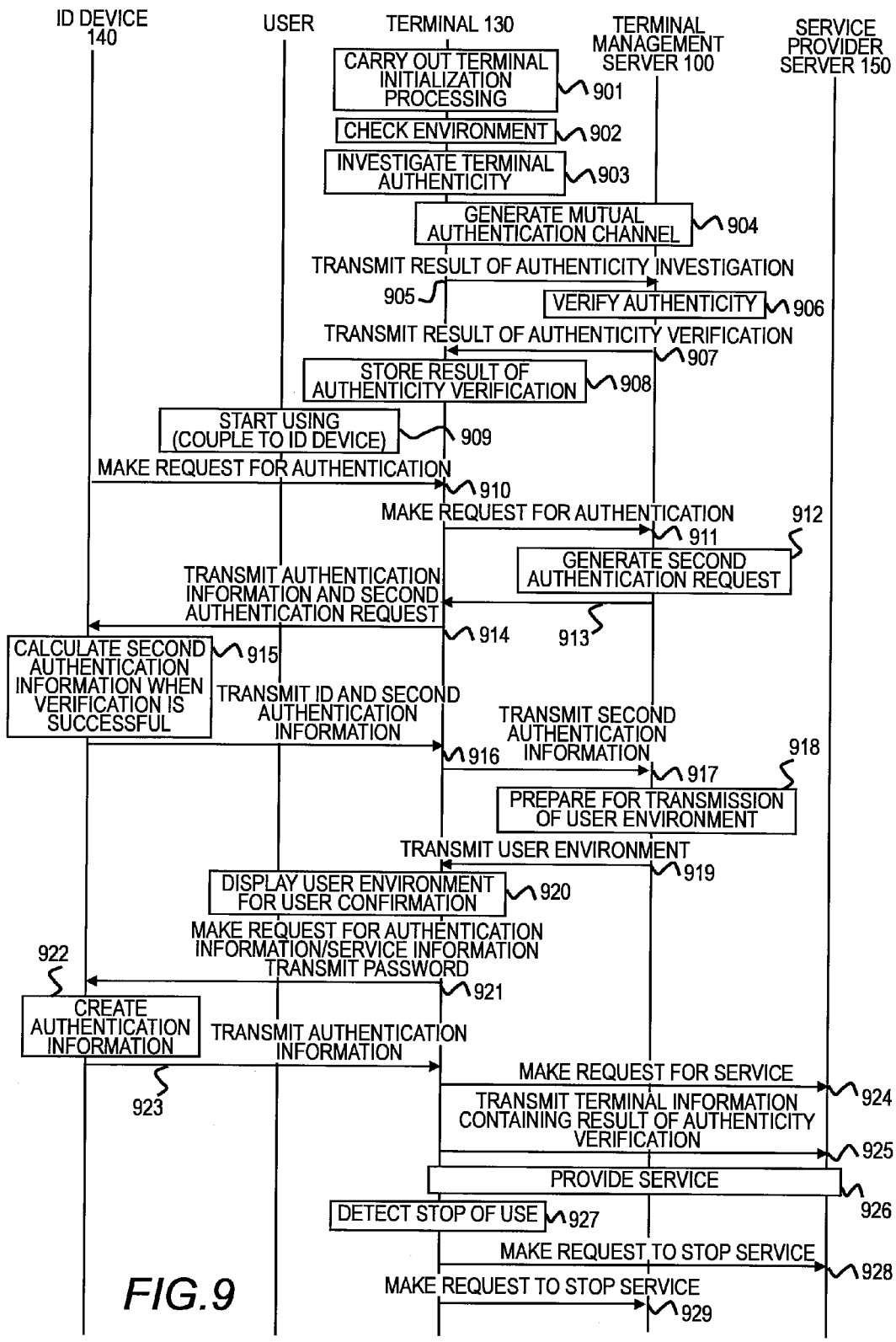
FIG. 9 is a sequence diagram of the processing executed by the terminal system according to the first embodiment.

FIG. 9 is a sequence diagram of the terminal system when the user uses the terminal 130 to determine the safety of the terminal 130 by means of the functions of the terminal management server 100, and then receives a service from the service provider server 150.

First, when the administrator or the user of the terminal 130 carries out an operation for startup, the terminal 130 carries out initialization processing 901. The initialization processing 901 includes startup of an OS of the terminal 130, startup of management applications (such as terminal management processing module 131), coupling to the network 120, check of processes, and recording to a log. The initialization processing 901 is carried out not only when the administrator or the user carries out the operation for the startup but also when the user finishes using the terminal 130, or when an instruction is received from the terminal management server 100.

Then, the terminal 130 carries out environment check processing 902. The environment check processing 902 includes checking of the coupling to the management server 100 via the network 120, and checking of information of a power supply, coupled peripheral devices, the installed location of the device, and the like.

In a step of an authenticity investigation of the terminal 130 (903), statuses of processes which are loaded to a memory 302 of the terminal 130 and are executed by a CPU 301, information of devices coupled to the terminal 130, a physical location at which the terminal 130 is installed, a status of the network 120, and a status of the storage 139 are investigated, by the terminal management processing module 131, in a sequence determined in advance by the administrator managing the terminal 130.

The investigation of the statuses of the processes which are loaded to the memory 302 of the terminal 130 and executed by the CPU 301 is carried out by the terminal management processing module 131 checking operation statuses of the processes operating on the terminal 130. Specifically, the terminal management processing module 131 checks a result of a collation of process operation information stored in the terminal management processing module 131 against a result of a process scan.

The investigation of the information of the devices coupled to the terminal 130 is carried out by the terminal management processing module 131 investigating statuses of the devices coupled to the terminal 130 and driver programs for driving the devices.

The investigation of the physical location at which the terminal 130 is installed is carried out by the terminal management processing module 131 investigating location information based on a positioning system such as a GPS receiver (not shown) coupled to the terminal 130 and an input from a camera and the like.

The investigation of the status of the network 120 is carried out by the terminal management processing module 131 checking an address on the network 120, a coupling route, a coupling quality, and the like. The investigation of the status of the storage 139 is carried out by the terminal management processing module 131 investigating a capacity of the storage 139, a status of partitions, and results of a file scan and virus scan on the storage 139.

The terminal management processing module 131 of the terminal 130 couples to the terminal-management-server processing module 102 of the terminal management server 100 via the communication unit 135 and the communication unit 101. The terminal management processing module 131 generates a communication channel (904) for a mutual authentication, an SSL communication, and the like with the terminal-management-server processing module 102. In Step 904, the terminal management processing module 131 verifies information transmitted by the terminal-management-server processing module 102 of the terminal management server 100 based on the server certificate, and the terminal-management-server processing module 102 verifies information transmitted by the terminal management processing module 131 based on the terminal ID and authentication information (such as public key certificate) held by the terminal 130.

After the processing of the mutual authentication in Step 904, between the terminal management processing module 131 and the terminal-management-server processing module 102, secret information for the communication is shared, and, consequently, a secure communication path is built. On this occasion, the authentication information used by the terminal processing module 131 is stored in the terminal information 138 on the storage 139. In preparation for theft of the terminal 130, the terminal information 138 on the storage 139 may be stored in an anti-tampering device. Moreover, there may be provided a configuration in which the administrator of the terminal 130 must enter secret information such as a password in order to use the terminal information 138 before the terminal information 138 becomes available.

Then, the terminal management processing module 131 of the terminal 130 transmits the result of the investigation of the authenticity which is obtained in Step 903 of the authenticity investigation by the terminal 130 and the terminal ID 401 assigned in advance to the terminal 130 to the terminal-management-server processing module 102 (905). The terminal-management-server processing module 102 of the terminal management server 100 verifies validity of the received result of the authenticity investigation by referring to the terminal information 107 stored in the storage 110 (906)

This verification is carried out by the terminal-management-server processing module 102 of the terminal server 100 based on the result of the authenticity investigation and the terminal ID received from the terminal 130 according to a policy contained in authenticity verification information 409 of the terminal information 107 stored in the storage 110.

For example, on the terminal management server 100 which has read the policy, the terminal-management-server processing module 102 searches for the terminal information 107 based on the terminal ID 401 received from the terminal 130, thereby determining whether a network address of the terminal 130 which are contained in the result of the authenticity investigation coincides with an address 404 in the terminal information 107. Moreover, the terminal-management-server processing module 102 searches the terminal information 107 based on the terminal ID 401 received from the terminal 130, thereby determining whether the latitude and the longitude of the terminal 130 contained in the result of the authenticity investigation coincide with a location 408 in the terminal information 107. Moreover, the terminal-management-server processing module 102 determines whether illegal programs and files are detected in the result of the authenticity investigation received from the terminal 130. Then, the terminal-management-server processing module 102 of the terminal management server 100 determines, when the address and the installed location coincide with the terminal information 107 and invalid programs and the like are not detected, that the terminal 130 is an authentic terminal.

When the terminal-management-server processing module 102 determines that the result of the authenticity investigation is valid, the terminal-management-server processing module 102 transmits the result of the authenticity verification to the terminal management processing module 131 (907). On the other hand, when the terminal-management-server processing module 102 determines that the result of the authenticity verification is invalid, the terminal-management-server processing module 102 notifies the administrator of the terminal management server 100 and the administrator of the terminal 130 of the result of the verification of the authenticity. This notification is made via an electronic mail, a facsimile, a network, or a telephone. Moreover, the terminal-management-server processing module 102 stores the result of the verification which is determined as invalid in the log 108 on the storage 110. Then, the terminal-management-server processing module 102 transmits a result indicating "determined as invalid" to the terminal management processing module 131. When the terminal management processing module 131 of the terminal 130 receives the result of the verification which indicates "determined as invalid" from the terminal-management-server processing module 102, the terminal management processing module 131 repeats the processing of the authenticity investigation (903) and the transmission of the result of the authenticity investigation of the terminal 130 (905) for a predetermined number of times. The terminal-management-server processing module 102 carries out the verification (906) as to whether or not the result of the authenticity investigation is valid each time the terminal-management-server processing module 102 receives the result of the authenticity investigation from the terminal 130.

Specifically, the verification of the result of the authenticity investigation is carried out by comparing the statuses of the processes operating inside the terminal 130, the information of the devices coupled to the terminal 130, the physical location at which the terminal 130 is installed, the status of the network 120, the status of the storage 139, the results of the file scan and virus scan, and the like, which have been transmitted, with information registered, in advance, to the terminal information 107.

Until the terminal management processing module 131 determines that the transmitted result of the authenticity investigation is valid, the terminal management processing module 131 shows a display indicating that the authenticity is being investigated on the display screen 801 of the terminal 130. When the terminal-management-server processing module 102 receives an invalid investigation result from a certain terminal 130 more than a predetermined number of times in a predetermined period, the terminal-management-server processing module 102 shuts off a subsequent communication between this terminal 130 and the terminal management server 100.

When a communication with a certain terminal 130 is shut off, the terminal-management-server processing module 102 notifies the administrator of the terminal management server 100 and the administrator of this terminal 130 of a result of the communication shutoff. This notification is carried out via an electronic mail, a facsimile, a network, or a telephone. Moreover, the terminal-management-server processing module 102 stores the result of the communication shutoff in the log 108 on the storage 110.

When the terminal management processing module 131 of the terminal 130 receives the result of the authenticity verification, the terminal management processing module 131 stores the result of the authenticity verification in the storage 139 (908). The result of the authenticity verification is secured by a protected communication (channel) between the terminal management server 100 and the terminal 130. Moreover, information transmitted to and received from the terminal management server 100 is encrypted by the public key held by the terminal 130, and is transmitted in a status in which the information can be decrypted only by the terminal management processing module 131. The result of the authenticity verification contains time information (how long ago the verification was carried out and the current time) and information such as a status of the terminal 130 which is used by the terminal-management-server processing module 102 to update the terminal information 107.

As a result of the authenticity investigation 903 and the authenticity verification 906, the terminal management server 100 determines that the terminal 130 is a computer on which illegal programs are not running, and which is installed at a predetermined location and can provide a secure communication. In other words, it is guaranteed that the environment of the terminal 130 is not tampered by a previous user of the terminal 130, and it is determined that the terminal 130 is authentic.

Moreover, when, in the authenticity investigation (903) carried out by the terminal 130, the investigation result includes a time when the investigation is carried out, and, in the authenticity verification (906) carried out by the terminal management server 100, the policy contained in the authenticity verification information 409 restricts a difference between the time of authenticity investigation carried out by the terminal 130 and the current time, if the difference exceeds a predetermined value, the investigation result is discarded and is not used. In other words, by prohibiting an old authenticity investigation result, accuracy of the determination of the authenticity can be increased. After the investigation result is discarded, the terminal management server 100 may instruct the terminal 130 to carry out again the authenticity investigation (903).

When the user uses the terminal 130, the user causes, via the interfaces 134 and 144, the terminal 130 and the ID device 140 to communicate with each other (909). As illustrated in FIG. 9, according to an instruction by the terminal management processing module 131, the device management module 141 of the ID device 140 transmits an authentication information request via the interfaces 144 and 134 to the terminal management processing module 131 (910). Specifically, the authentication information request is a request for a digest authentication. As an example of the digest authentication, the authentication by means of challenge and response specified by the RFC2069 is carried out between the ID device 140 and the terminal management server 100.

The terminal management processing module 131 transmits the authentication information request received from the ID device 140 to the terminal-management-server processing module 102 (911). When the terminal management server 100 receives the authentication information request from the terminal 130 according to the challenge and response, the terminal management server 100 verifies information of the terminal 130 and the result of the authenticity verification based on a transmission result (history 406) of this terminal (terminal 130) which is set in the terminal information 107. Then, when a result of the authenticity verification coincides with a predetermined policy, the terminal-management-server processing module 102 generates authentication information and a second authentication information request according to the challenge and response (912).

The terminal-management-server processing module 102 transmits the authentication information and the second authentication information request which have been generated in the processing (912) to the terminal management processing module 131 (913), and the terminal management processing module 131 transmits the received authentication information and second authentication information request via the interfaces 134 and 144 to the ID device 140 (914).

The ID device 140 investigates validity of the authentication information received from the terminal 130 according to the challenge and response, and when the received authentication information is valid, the ID device 140 generates the ID stored in the storage 142 and second authentication information in response to the second authentication information request received from the terminal 130 (915). When this processing (915) is finished, the digest authentication according to the challenge and response between the ID device 140 and the terminal management server 100 is completed.

On this occasion, how the ID device 140 determines the validity of the authentication information depends on the type of the authentication information received from the terminal 130. When the authentication information is a password (pre-share common key), the determination is carried out by means of comparison between a password stored in the storage 142 and the received authentication information. When the authentication information relates to a digest authentication, the authentication request and authentication information contains random numbers, and the validity of the authentication information is determined by means of verifying a digest. When the authentication information is a signature, the validity of the authentication information is carried out by verifying the signature.

In Step 915, when the ID device 140 cannot verify the validity of the authentication information, the ID device 140 does not carry out subsequent responses. When the ID device 140 has a display feature or a speaker, and the validity of the authentication information cannot be verified, the ID device 140 displays, on a screen, information indicating that the validity of the authentication information cannot be verified, or warns the user by generating a music sound or an alarm sound. Similarly, even when the validity of the authentication information is verified, the ID device 140 notifies the result of the verification to the user by displaying, on the screen, information indicating that the validity of the authentication information has been verified, or generating a music sound or an alarm sound, which is different from the music sound or the alarm sound in the case in which the validity cannot be verified.

The ID device 140 transmits an ID (user ID 501) and second authentication information (secret information 503) read from the storage 142 to the terminal management processing module 131 (916). The terminal management processing module 131 transmits the received ID and second authentication information to the terminal-management-server processing module 102 (917).

By comparing the ID and the second authentication information received from the terminal 130 with the user information 105 on the storage 110, the terminal-management-server processing module 102 authenticates the user (holder of the ID device 140) using the terminal 130. This authentication is carried out by searching, based on the ID received from the terminal 130, for an user ID 501 in the user information 105, and comparing secret information 503 of a searched record and the received second authentication information, thereby determining whether or not the user is a valid user.

When the terminal-management-server processing module 102 determines, based on the ID and the second authentication information which are received from the ID device 140, that the user is a valid user, the terminal-management-server processing module 102 prepares for transmission of a user environment registered by the user. The user environment is stored in a status 506 of the user information 105, and is associated with the ID 501 of the user. The user environment includes, for example, information on the user (name, nickname, ID number, illustration, and photograph), and data and scripts such as applications operating on the terminal 130, and screen configurations used by the applications operating on the terminal 130.

When the terminal-management-server processing module 102 prepares for the transmission of the user environment (918), the terminal-management-server processing module 102 selects, out of the user environments registered by the user, an environment which can be used on the terminal 130. The environment is selected by referring to the status of the terminal 130 which is contained in the result of the authenticity verification, the terminal information 107, and requests transmitted from the user along with the authentication information. If screen configuration data and scripts for a browser application are transmitted to a terminal 130 on which the browser application is not installed, the user cannot use the screen configuration data and scripts on the terminal 130, and thus, the selection of the usable information is carried out in order to prevent an environment which cannot be used from being specified.

The terminal-management-server processing module 102 transmits the user environment determined in the preparation for transmitting the user environment (918) to the terminal management processing module 131 (919). The terminal management processing module 131 executes the user environment received from the terminal management server 100 on the terminal 130. To the user environment transmitted in Step 919, according to necessity, authentication information (signature) guaranteeing safety on the execution on the terminal 130 is added. The terminal 130 confirms this authentication information guaranteeing the safety. The terminal management processing module 131 classifies the user environment received from the terminal server 100 according to a predetermined method, and executes and displays the environment on the terminal 130. When the user environment relates to the user, the terminal management processing module 131 displays information relating to the user, and the user confirms the information (920). Moreover, when the user environment relates to applications (programs) operable on the terminal 130, the applications are executed on the terminal 130, and the user confirms the applications (920). In this confirmation, when the user environment relates to data such as screen configurations and scripts which are used by the applications running on the terminal 130, after the user is made to confirm whether or not to run necessary applications, the data and scripts are transmitted to the applications, and the user confirms the data and scripts.

Only after the user couples the ID device 140 to the terminal 130, and confirms the information displayed in Step 920, the user recognizes that the terminal 130 is a terminal 130 which can be used validly.

Then, the terminal management processing module 131 or an application running on the terminal 130 prepares for providing of a service to the user. When transmission of further authentication information is necessary in order to use the service, the user responds to the terminal 130 by following displays on the screen 801, such as requests to input authentication information (requests for an ID, a password, biometrics authentication information, privacy information, and other confidential information). The input authentication information is transmitted to the ID device 140 and the terminal-management-server processing module 102 (921). The ID device 140 transmits, based on the received authentication information (such as a personal identification number), further authentication information (signature information) to the terminal 130 (922 and 923).

The user uses the terminal management processing module 131 or the application running on the terminal 130 to request the terminal management server 100 and the service provider server 150 to provide a service (924). In Step 924, the service provider server 150 authenticates the user of the terminal 130, and encrypts communication at required quality for providing the service. Then, the terminal 130 transmits terminal information containing the result of the authenticity verification (925). The service provider server 150 verifies the service request containing the authentication information and the terminal information containing the result of the authenticity verification transmitted by the terminal 130, and provides, according to a policy for providing the service, which is set in advance, the user with the service via the terminal 130 (926). The terminal information containing the result of the authenticity verification contains information such as the signature indicating that the terminal management server 100 has issued the authenticity verification result in Step 907, and thus, the service provider server 150 can carry out the verification.

On this occasion, in Step 916 of the transmission of the authentication information, by the terminal 130 receiving a service executed by the user before the start of the use of the terminal 130 and a status of the service from the ID device 140, and including them into the service request transmitted in Step 924, the user can, by a simple operation, continue the service executed before the start of the use of the terminal 130 and the status of the service on the terminal 130. The service and the status of the service imply a service used by the user on a terminal 130 different from the terminal 130 with which the ID device 140 has previously communicated, and a status of the service. Alternatively, when the ID device 140 has functions of the terminal 130, the service and the status of the service implies a service running on the ID device 140 and a status of the service.

Moreover, the communication between the ID device 140 and the terminal 130, and the communication between the service provider server 150 and the terminal 130 may be encrypted for preventing eavesdropping. Moreover, the request for the authentication information and the production of the authentication information are not limited to those according to the digest authentication and the signature verification using the public key encryption, and may be a check of biometrics information, or a request for other authentication information and production of a response to the request for the other authentication information.

The terminal management processing module 131 detects a status in which the user has finished the use of the service (927), transmits the fact that the user has stopped the use of the service to the service provider server 150 (928), and also transmits this status to the terminal management server 100 (929). A method of detecting the status in which the user has finished using the service includes detection of a user's input indicating the end of the service to the input device of the terminal 130, detection of no input for a predetermined period, detection of a passage of a predetermined period since the start of the use of the service by the user, detection of no communication between the ID device 140 and the terminal 130 for a predetermined period due to the user leaving a location of use, and determination of the finish of the use of the service by the terminal 130 by imaging a status of the use of the service of the user using a camera. When the terminal management processing module 131 detects that the user has finished using the service, the terminal management processing module 131 restarts the terminal 130 or initializes contents of the memory 302 and the storage 139 described later. As a result, Step 901 starts, and a status in which the next user can safely use the terminal 130 is provided.

The service received by the terminal 130 from the service provider server 150 includes transmission/reception of information by means of streaming, a television conference, a telephone conference, transmission/reception of electronic mails, a remote access via a virtual private network, providing of a virtual desktop, use of web applications, use of online games, e-learning, and blogs, use of SIP services, use of a position information service, use of a sales force automation, use of a mail service, use of a personal information management service, use of office tools, and use of a search service.

FIG. 4 illustrates an example of the terminal information 107 stored in the storage 110 of the terminal management server 100. In FIG. 4, in the terminal information 107, a user ID 402 of a user who uses the terminal 130, a device type 403, the address 404, a management ID 405, the history 406, a status 407, the location 408, and a remark 410 are registered in association with the terminal ID 401.

The terminal ID 401 is an individual ID assigned by the administrator of the terminal 130 to the terminal 130 for management. On the terminal 130, the terminal ID 401 is stored in the storage 139. In Step 904, the terminal ID 401 is transmitted from the terminal management server 100. The authenticity investigation result transmitted in Step 905 contains the information relating to the terminal 130 in the terminal information 107, and thus, the terminal management server 100 updates the terminal information 107 relating to the terminal 130 based on the authenticity investigation result transmitted by the terminal 130.

The user ID 402 indicates a user currently using the corresponding terminal 130. The device type 403 indicates a device type corresponding to the terminal 130. The address 404 indicates an address such as an IP address which is an identifier on the network 120 to which the terminal 130 is coupled. The management ID 405 is an ID of a management organization such as a management company or the administrator that manages the terminal 130. The history 406 stores a log recording information transmitted by the terminal 130 to the terminal management server 100 and statuses of the terminal 130. This log contains combinations of a time and other information relating to the terminal 130. The other information relating to the terminal 130 includes status information recording times when the terminal 130 has started, stopped, and been reset, maintenance information, applications, and services, and device information of the devices coupled to the terminal 130.

The status 407 of the terminal 130 indicates a current status of the corresponding terminal 130. For example, the status 407 is a status of a service used by the user, or a status of a service ready for the use by the user. The location 408 indicates the location at which the terminal 130 is installed, and is represented by a latitude and a longitude, for example. The authenticity verification information 409 stores information and policies used by the terminal-management-server processing module 102 for verifying whether or not the investigation result is valid in Step 906. The authenticity verification information 409 is defined and updated by the administrator of the terminal 130. The remark 410 stores other error status information, maintenance information, and special information for authentication.

FIG. 5 illustrates an example of the user information 105 stored in the storage 110 of the terminal management server 100. In the user information 105, a public key certificate 502 of a user, the secret information 503 such as a common key, a management ID 504, a history 505, the status 506, a terminal ID 507 of a terminal used by the user, and a remark 508 are registered in association with the user ID 501.

The user ID 501 is an individual ID assigned by the administrator of the system to a user for managing the user. The user ID 501 is stored in the ID device 140 and managed by the user (or the administrator). The ID transmitted in Step 916 contains the user ID 501 or is bound to the user ID 501 using a predetermined method, and is managed.

The public key certificate 502 of the user is a public certificate issued to the user by a trusted certificate agency, and is a public key certificate corresponding to a secret key stored by the user in the ID device 140. The secret information 503 such as the common key includes a pre-shared common key, session key, and random number used for mutual authentication and for sharing common secret information with the ID device 140 used by the user.

The management ID 504 is an ID of a management organization such as a management company or an administrator that manages the corresponding user. The history 505 stores a log recording processing carried out by the user on the terminal 130, and statuses (statuses of applications). This log contains combinations of a time and other information relating to the processing carried out by the user and statuses. The other information relating to the processing carried out by the user and statuses includes information relating to the start of the use of the terminal 130, operations carried out on the terminal 130, and the end of the use of the terminal 130, and information of a used ID device 140.

The status 506 indicates a situation in which the corresponding user is currently using the service. The terminal ID 507 is the terminal ID of the terminal 130 which the user is currently using. The remark 508 stores other error status information, maintenance information, and special information for authentication.

Figure 2:
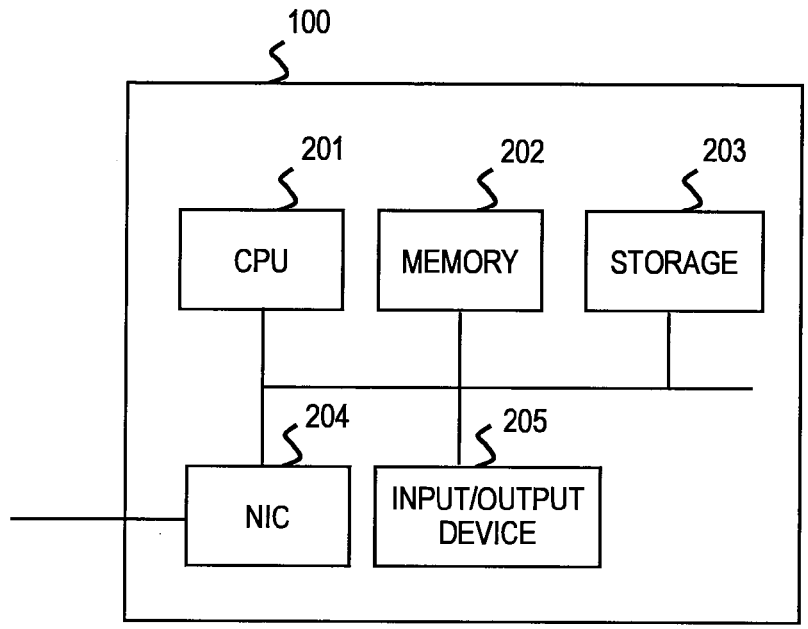
FIG. 2 is a block diagram illustrating a hardware configuration of the terminal management server according to the first embodiment.

FIG. 2 is a block diagram illustrating a hardware configuration of the terminal management server 100. The terminal management server 100 has an internal configuration in which a CPU 201, a memory 202, a storage 203, a network interface card (NIC) 204 and an input/output device 205 are coupled to one another via a bus. The NIC 204 is coupled to the network 120, and thus constitutes the communication unit 101 of FIG. 1. The storage 203 corresponds to the storage 110 of FIG. 1, and functions of the storage 203 are realized by a locally coupled storage system or a storage (not shown) on the network 120.

Functions of programs corresponding to the terminal-management-server processing module 102 and the terminal information registration module 103 are realized by loading the programs stored in the storage 110 to the memory 202, and executing the loaded programs by the CPU 201.

Figure 3:
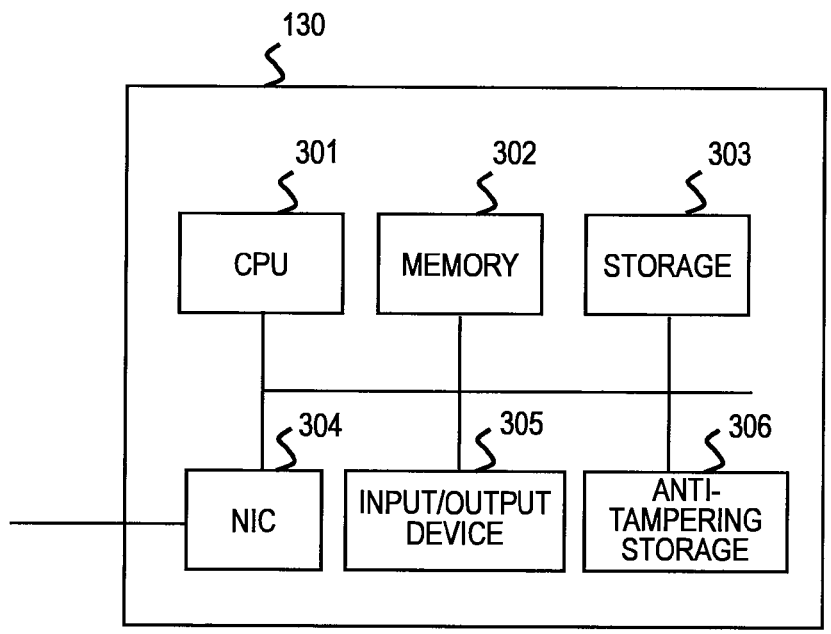
FIG. 3 is a block diagram illustrating a hardware configuration of the terminal according to the first embodiment.

FIG. 3 is a block diagram illustrating a hardware configuration of the terminal 130. The terminal 130 has an internal configuration in which the CPU 301, the memory 302, a storage 303, an NIC 304, an input/output device 305, and an anti-tampering storage 306 are coupled to one another via a bus. The NIC 304 is coupled to the network 120. The storage 303 or the anti-tampering storage 306 and storage functions on the network 120 are combined to form the storage 139 illustrated in FIG. 1.

Functions of programs corresponding to the terminal management processing module 131 and the service processing module 132 are realized by loading the programs stored in the storage 303 to the memory 302, and executing the loaded programs by the CPU 301. The anti-tampering storage 306 stores the authentication information held by the user and the terminal 130. The terminal ID and authentication information relating to the terminal ID (such as the common key, the secret key, and the public key certificate) are also stored in the anti-tampering storage 306. The input/output device 305 includes the communication interface 134, input devices such as a screen, a touch panel, a keyboard, and a numerical key pad, a reader/writer for a magnet smart card, a contact smart card, and the like, and a communication interface for a contactless smart card and the like.

Figure 6:
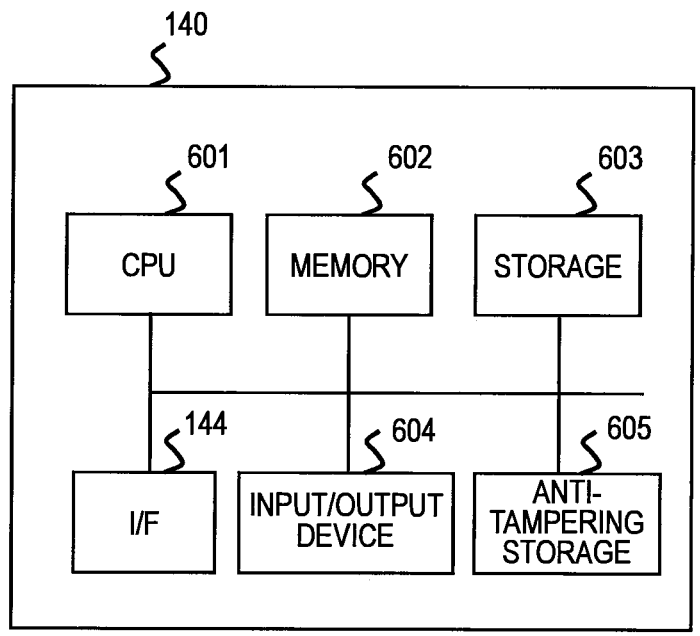
FIG. 6 is a block diagram illustrating a hardware configuration of the ID device according to the first embodiment.

FIG. 6 is a block diagram illustrating a hardware configuration of the ID device 140. The ID device 140 has an internal configuration in which a CPU 601, a memory 602, a storage 603, the communication interface 144, an input/output device 604, and an anti-tampering storage 605 are coupled to one another via a bus. The communication interface 144 is configured so as to be coupled to the communication interface 134 of the terminal 130. The ID device 140 may include a communication unit (not shown), and may provide terminal functions used for receiving provided services as in the terminal 130.

Functions of the storage 142 are realized by combining functions of the storage 603 or the anti-tampering storage 605. The functions of the device management module 141 are realized by loading programs stored in the storage 603 to the memory 602, and executing the loaded programs by the CPU 601. The anti-tampering storage 605 stores authentication information held by the user (such as the user ID 501 and the secret information 503) and information for guaranteeing the authenticity of the terminal management server 100 (such as a public key). The input/output device 604 includes input devices such as a screen, a touch panel, a keyboard, and a numerical key pad, a reader/writer for a magnet smart card, a contact smart card, and the like, and a communication interface for a contactless smart card and the like.

Figure 7:
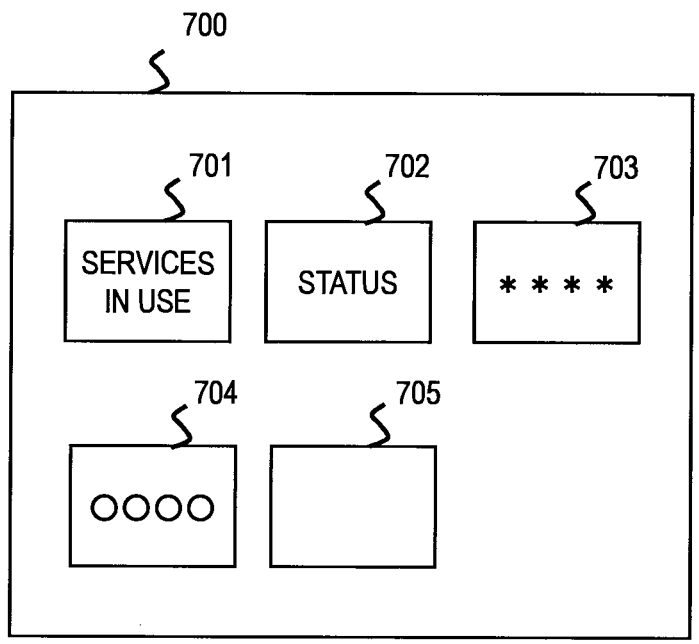
FIG. 7 describes information displayed by the terminal management processing module on the screen of the terminal according to the first embodiment.

FIG. 7 describes information (user environment display 700) displayed by the terminal management processing module 131 on the screen 801 of the terminal 130 when the user environment is transmitted to the terminal 130 in Step 919 illustrated in FIG. 9 according to this embodiment. The user environment display 700 internally includes a service display section 701, a status display section 702, a password input section 703, a personal information display section 704, and an image display section 705. The user environments can be registered by the user arbitrarily in the terminal management server 100, thus, a name, a nickname, and information relating to the user may be displayed on the personal information display section 704, and information relating to the user such as a user's favorite photograph may be displayed on the image display section 705. The user checks the user environment displayed on the terminal 130, thereby confirming safety of the terminal 130 and receiving highly convenient services.

As mentioned above, by constituting the terminal system in which the terminal 130 to be used by an unspecified number of users and the terminal management server 100 are coupled to each other via the network 120, a user, by simple operations, uses the terminal 130 with uncertain authenticity, and receives provided services, resulting in enhanced convenience of the user and safety in handling information such as viewing and modifying the information.

Moreover, by a user simply carrying out the authentication operation using the ID device 140 on the terminal 130, the user can constitute a user environment adapted to the specifications of the terminal 130 and the status of the use thereof on the terminal 130, thereby reducing a period until a service is available, resulting in enhanced convenience of the user.

Second Embodiment

Figure 10:
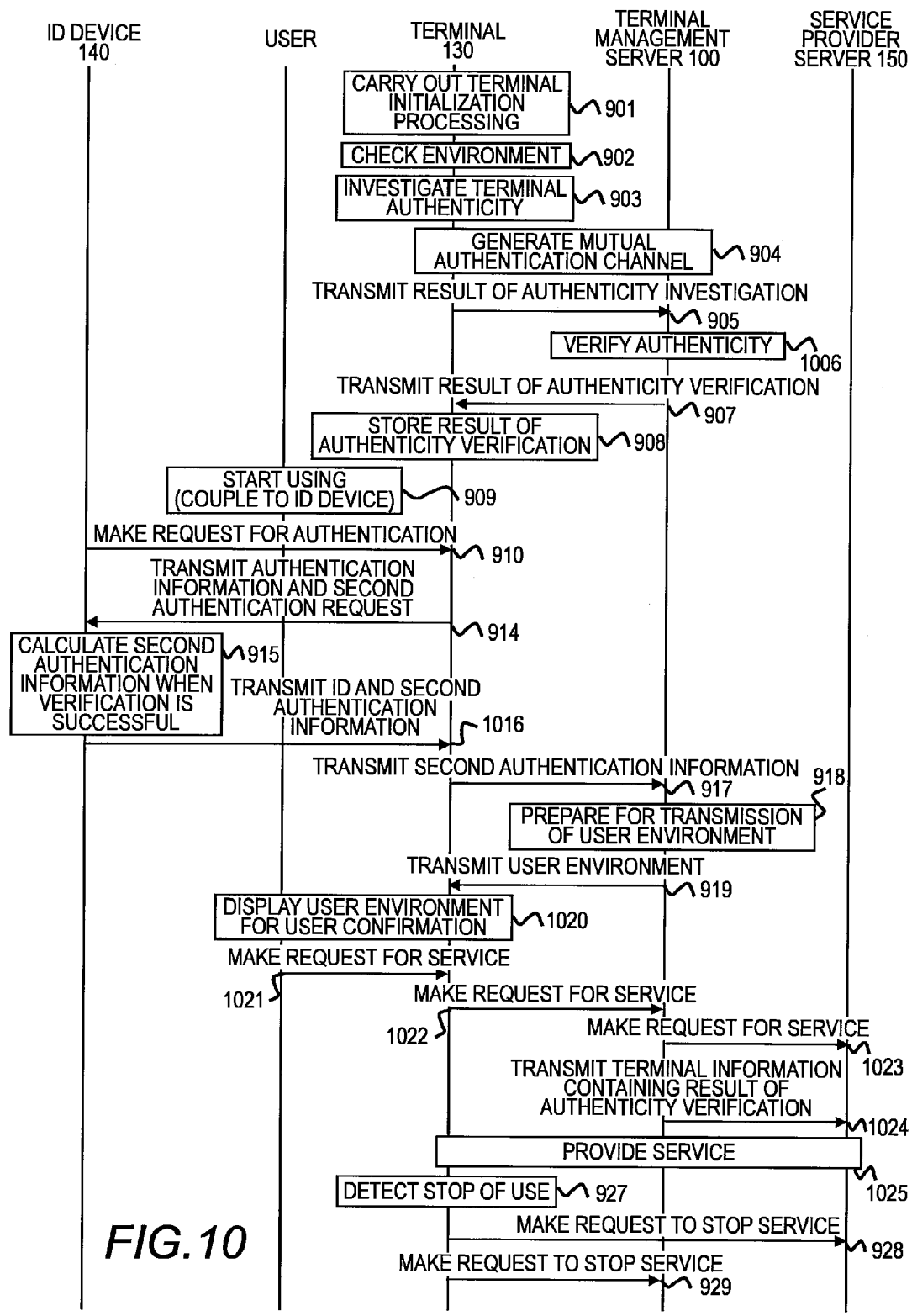
FIG. 10 illustrates a second embodiment, and is a sequence diagram of a terminal system.

FIG. 10 illustrates a second embodiment, and is a sequence diagram of a system in which the user uses the terminal 130 to determine the safety of the terminal 130 by means of the functions of the terminal management server 100, and then receives a service from the service provider server 150.

Differences from FIG. 9 according to the first embodiment are in that contents of the result of the authenticity verification in Step 1006 are different, and that, in steps subsequent to Step 1020 of displaying and asking the user to check the user environment, the terminal management server 100 mainly carries out a procedure for the user to use the service. The other configurations are the same as those illustrated in FIG. 9 according to the first embodiment.

In Step 1006, the terminal-management-server processing module 102 verifies the authenticity. When the result of the authenticity investigation is determined as valid, the result of the authenticity verification is transmitted from the terminal-management-server processing module 102 to the terminal management processing module 131 (907). This result of the authenticity verification is encrypted so that the terminal 130 can decrypt the encrypted result, and the contents can thus be verified by the ID device 140. When the user starts using the terminal 130 (909), in response to the authentication request (910) by the ID device 140, by transmitting the result of the authentication verification, as the authentication information and the second authentication request, to the ID device 140, the ID device 140 can confirm the authenticity of the terminal 130, and can proceed to processing of Step 1016 and subsequent steps.

On this occasion, the ID device 140 can verify the authenticity by collating the contents of the authenticity to time information held by the ID device 140 or by inquiring contents of the authenticity of the terminal management server 100 via another network. Moreover, the authenticity may be verified by displaying a result obtained by calculation from the result of the authenticity verification to the user, thereby causing the user to compare the obtained result to the display on the terminal 130.

Moreover, by including, in the second authentication information transmitted in Step 1016, a service request and authentication information for using the service, after the user transmits the service request, via the terminal 130, to the terminal management server 100 (1021 and 1022), the terminal management server 100 transmits, to the service provider server 150, a request to start providing the service to the terminal 130, and the terminal information containing the result of the authenticity verification of the terminal 130 (1023 and 1024), and the user receives the provided service (1025).

As mentioned above, by constituting the terminal system in which the terminal 130 and the terminal management server 100 are coupled to each other via the network 120, compared with the first embodiment, a period until the start of a service, and operations carried out by the user can be reduced, resulting in enhanced convenience for the user.

Moreover, when, in Step 1016, a configuration in which a service executed by the user before the start of the use of the terminal 130 and a status of the service are received by the terminal 130 is provided, and, in Step 1025, the user can thus continue the service executed before the start of the use of the terminal 130, and the status of the service, the user can, by a reduced number of operations, continue the service executed before and the status of the service. As a result, the convenience for the user is enhanced. A service and a status of the service are a service used by the user on a terminal 130 different from the terminal 130 with which the ID device 140 has previously communicated, and a status of the service, or, when the ID device 140 has the functions of the terminal, a service executed on the ID device 140 and a status of the service.

Though, in the above-mentioned respective embodiments, an example in which the terminal management server 100 and the service provider server 150 are respectively constituted by different computers is described, the functions of the terminal management server 100 and the service provider server 150 may be provided by one computer.

As mentioned above, this invention can be applied to a computer system including terminals which are temporarily rented and used by an unspecified number of users, and to a management server for managing terminals which are temporarily rented and used by an unspecified number of users.

While the present invention has been described in detail and pictorially in the accompanying drawings, the present invention is not limited to such detail but covers various obvious modifications and equivalent arrangements, which fall within the purview of the appended claims.

What is claimed is:

1. A terminal system, comprising:
a terminal comprising a processor and a memory;
a terminal management server coupled to the terminal via a network; and
an ID device configured to store an ID and authentication information associated with a user to be coupled to the terminal via a communication interface,
wherein the terminal further comprises a terminal management processing module configured to carry out authenticity investigation for investigating authenticity of the terminal in the terminal and to transmit a result of the authenticity investigation to the terminal management server;
wherein the terminal management server comprises a terminal management server processing module configured to transmit a result of verification of the authenticity investigation upon determination that the result of the authenticity investigation is valid;
wherein the ID device comprises a device management module configured to transmit an authentication request for requesting an authentication of the terminal by challenge and response to the terminal;
wherein the terminal management processing module in the terminal is configured to transmit the authentication request to the terminal management server;
wherein the terminal management server further comprises:
a terminal management server processing module configured to generate authentication information and a second authentication information request for requesting an authentication of the ID device in a case where the result of verification of the authenticity investigation based on the authentication request meets a predetermined policy and to transmit the authentication information and the second authentication information request to the terminal; and
a unique information transmission module configured to transmit information unique to the user to the terminal;
wherein the terminal further comprises a display unit configured to display the information unique to the user received from the terminal management server so that the user confirms the information unique to the user, to thereby guarantee authenticity of the terminal;
wherein the terminal management processing module in the terminal is configured to transmit the received authentication information and the received second authentication information request to the ID device;
wherein the ID device is configured to transmit the ID and the second authentication information responsive to the second authentication information request to the terminal in a case where the authentication information is valid;
wherein the terminal further comprises:
a communication interface configured to communicate with the ID device; and
an authentication request module configured to acquire the ID and the second authentication information from the ID device via the communication interface and to transmit an authentication request containing the ID and the second authentication information to the terminal management server;
wherein the terminal management server further comprises:
a terminal information registration module configured to register, in advance, information unique to each user of the terminal; and
an authentication module configured to carry out authentication by comparing the ID and the authentication information, which are contained in the authentication request received from the terminal to user information registered in advance.

2. The terminal system according to claim 1, wherein:
the terminal information registration module configured to register, in advance, the information unique to the each user of the terminal is configured to register, in advance, an application to be executed for the each user; and the terminal is configured to acquire the application from the information unique to the each user received from the terminal management server and to execute the application to guarantee the authenticity of the terminal.

3. The terminal system according to claim 1, further comprising:
an authenticity investigation module configured to add information on a time at which the investigation of the status of the memory is carried out to the result of the investigation; and
an authenticity determination module configured to discard the result of the investigation when a difference between the information on the time contained in the result of the investigation carried out by the authenticity investigation module and a current time exceeds a predetermined value.

4. The terminal system according to claim 1, wherein:
the terminal information registering module configured to register, in advance, the information unique to the each user of the terminal is configured to store an application used by the user immediately before the user uses the terminal as the information unique to the each user; and
the terminal is configured to acquire the application from the information unique to the each user received from the terminal management server and to execute the application to continuously provide the user with the application.

5. The terminal system according to claim 1, further comprising a service provider server configured to provide the terminal with a service, wherein:
when the terminal management server receives a request for a service from the terminal, the terminal management server is configured to transmit the request for the service along with a result of the authentication carried out by the authentication module, and a result of the determination carried out by the authenticity determination module to the service provider server; and
the service provider server is configured to receive the result of the authentication and the result of the determination carried out by the authenticity determination module and to start providing the service in response to the request for the service.

6. A terminal coupled to a network, comprising:
a processor;
a memory; and
a terminal management processing module configured to carry out authenticity investigation for investigating authenticity of the terminal in the terminal and to transmit a result of the authenticity investigation to the terminal management server;
wherein a device management module in an ID device is configured to transmit an authentication request for requesting an authentication of the terminal by challenge and response to the terminal;
wherein the terminal management processing module in the terminal is configured to transmit the authentication request to the terminal management server;
wherein a terminal management server processing module in the terminal management server is configured to generate authentication information and a second authentication information request or requesting an authentication of the ID device in a case where a result of verification of the authenticity investigation based on the authentication request meets a predetermined policy and to transmit the authentication information and the second authentication information request to the terminal;
wherein a unique information transmission module in the terminal management server is configured to transmit information unique to the user to the terminal;
wherein the terminal further comprises a display unit configured to display the information unique to the user received from the terminal management server so that the user confirms the information unique to the user, to thereby guarantee authenticity of the terminal;
wherein the terminal management processing module is configured to transmit the received authentication information and the received second authentication information request to the ID device;
wherein the ID device is configured to transmit the ID and the second authentication information responsive to the second authentication information request to the terminal in a case where the authentication information is valid; and
wherein the terminal further comprises:
a communication interface configured to communicate with the ID device; and
an authentication request module configured to acquire, via the communication interface, the ID and the second authentication information from the ID device, and to transmit an authentication request containing the ID and the second authentication information to the network.

7. A terminal management server that is coupled to a network and is configured to manage a terminal coupled to the network, comprising:
a processor; and
a memory,
wherein a terminal management processing module in the terminal is configured to carry out authenticity investigation for investigating authenticity of the terminal in the terminal and transmits a result of the authenticity investigation to the terminal management server;
wherein the terminal management server further comprises a terminal management server processing module configured to transmit a result of verification of the authenticity investigation upon determination that the result of the authenticity investigation is valid;
wherein a device management module in an ID device is configured to transmit an authentication request for requesting an authentication of the terminal by challenge and response to the terminal;
wherein the terminal management processing module in the terminal is configured to transmit the authentication request to the terminal management server;
wherein the terminal management server further comprises:
a terminal management server processing module configured to generate authentication information and a second authentication information request for requesting an authentication of the ID device in a case where a result of verification of the authenticity investigation based on the authentication request meets a predetermined policy and transmitting the authentication information and the second authentication information request to the terminal; and
a unique information transmission module configured to transmit information unique to the user to the terminal;
wherein the ID device is configured to transmit the ID and the second authentication information responsive to the second authentication information request to the terminal in a case where the authentication information is valid; and
wherein the terminal management server further comprises:

a terminal information registration module configured to register, in advance, information unique to each user of the terminal; and an authentication module configured to carry out authentication by comparing an ID and the second authentication information which are contained in the second authentication information request received from the terminal to user information registered in advance.

\* \* \* \* \*